US011796747B2

United States Patent
Fan et al.

(10) Patent No.: US 11,796,747 B2
(45) Date of Patent: Oct. 24, 2023

(54) DIFFRACTIVE OPTICAL WAVEGUIDE AND DISPLAY DEVICE

(71) Applicant: JIAXING UPHOTON OPTOELECTRONICS TECHNOLOGY CO., LTD., Tongxiang (CN)

(72) Inventors: Zhentao Fan, Beijing (CN); Xingming Zhao, Beijing (CN); Kehan Tian, Beijing (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 18/153,515

(22) Filed: Jan. 12, 2023

(65) Prior Publication Data

US 2023/0221503 A1 Jul. 13, 2023

(30) Foreign Application Priority Data

Jan. 13, 2022 (CN) .......................... 202210039248.3

(51) Int. Cl.
*G02B 6/42* (2006.01)
*G02B 27/42* (2006.01)

(52) U.S. Cl.
CPC ....... *G02B 6/4204* (2013.01); *G02B 27/4205* (2013.01); *G02B 27/4272* (2013.01)

(58) Field of Classification Search
CPC .... G02B 6/10; G02B 6/4204; G02B 27/0081; G02B 27/0172; G02B 27/4205; G02B 27/4272; G02B 5/1819
See application file for complete search history.

(56) References Cited

U.S. PATENT DOCUMENTS

| 2018/0210205 A1* | 7/2018 | Grey | G02B 27/0081 |
| 2019/0121027 A1* | 4/2019 | Popovich | G02B 6/2726 |
| 2020/0209630 A1* | 7/2020 | Schultz | G02B 27/4272 |

FOREIGN PATENT DOCUMENTS

CN 111679362 A 9/2020

* cited by examiner

*Primary Examiner* — Michael P Mooney
(74) *Attorney, Agent, or Firm* — HAUPTMAN HAM, LLP (57) ABSTRACT

A diffractive optical waveguide is provided, which comprises a waveguide substrate and a coupling-in grating, a coupling-out grating, and a coupling-in end light-return grating formed on the substrate, the coupling-in grating couples an input beam into the waveguide substrate and forms a first beam of light propagating toward the coupling-out grating and a second beam of light not propagating toward the coupling-out grating, the coupling-out grating couples at least a part of the light propagating therein out of the substrate, and the coupling-in end light-return grating diffracts the second beam of light so that it propagates toward the coupling-out grating. A display device having the above diffractive optical waveguide is also disclosed. By providing the coupling-in end light-return grating, optical coupling efficiency of the diffractive optical waveguide is improved, and the energy distribution uniformity of an output field of the diffractive optical waveguide is improved.

13 Claims, 6 Drawing Sheets

DIFFRACTIVE OPTICAL WAVEGUIDE AND DISPLAY DEVICE

FILED OF THE INVENTION

The invention relates to display technology based on diffraction, in particular to a diffractive optical waveguide and a display device comprising the same, which can be used for augmented reality display.

BACKGROUND

With the high development of semiconductor technology, the way of interaction between humans and computers is developing rapidly. Among them, Augmented Reality (AR) display can provide human beings with more dimensional information, and has attracted widespread attention. AR glasses are one of the important mediums in the field of augmented reality display. Diffractive optical waveguide has the advantages of strong mass production, thinness, etc. It has gradually been recognized in the field of AR display and is expected to become the mainstream technology development direction in the field of AR in the future.

Figure 13:
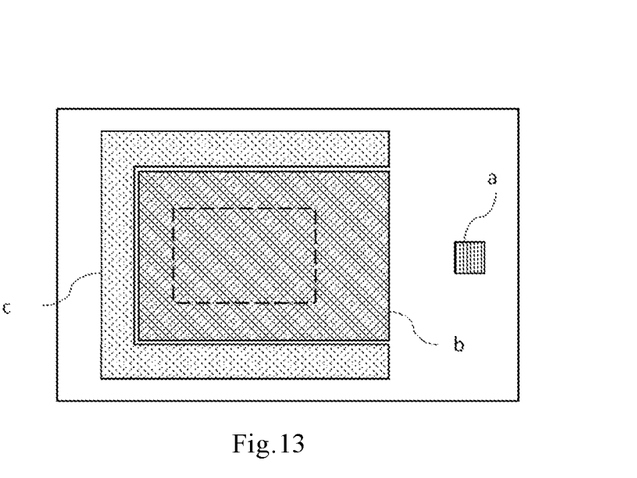
FIG. 13 is a schematic diagram of a diffractive optical waveguide for display in the prior art.

Current diffractive optical waveguides for AR display have deficiencies. For example, the overall optical coupling efficiency of the diffractive optical waveguide is not high enough, resulting in the field of view displayed by AR is not bright enough. In addition, for example, the optical energy distribution uniformity of the optical output field of the diffractive optical waveguide still needs to be improved. In order to improve the optical coupling efficiency of the diffractive optical waveguide and improve the optical energy distribution uniformity of the optical output field, people have proposed a diffractive optical waveguide as shown in FIG. 13, in which a coupling-in grating a, a coupling-out grating b, and a light-return grating c are arranged on a waveguide substrate. The coupling-in grating a couples incident light carrying image information into the waveguide substrate. The coupling-out grating b expands the light carrying image information in a plane where the waveguide substrate is located, and at the same time couples the light out of the waveguide substrate. The light-return grating c is arranged around the end of the coupling-out grating b away from the coupling-in grating a, and is used to return the light that leaves the coupling-out grating b and continues to propagate in the waveguide substrate to the coupling-out grating b. However, the improvement of the overall optical coupling efficiency of the diffractive optical waveguide by the design shown in FIG. 13 is still very limited. In addition, the optical output field of the coupling-out grating b tends to be in a non-uniform state where the central area (as shown by the dotted line box in FIG. 13) is dark and the surrounding area is bright, resulting in a poor display effect.

SUMMARY

The invention aims to provide a diffractive optical waveguide and a display device comprising the diffractive optical waveguide, so as to at least partly address the deficiencies in the prior art.

According to one aspect of the invention, a diffractive optical waveguide is provided, comprising a waveguide substrate, the waveguide substrate being formed with a coupling-in grating and a coupling-out grating, the coupling-in grating being configured to couple an input beam into the waveguide substrate so that the input beam propagates in the waveguide substrate through total reflection and forms a first beam of light propagating toward the coupling-out grating and a second beam of light not propagating toward the coupling-out grating, and the coupling-out grating being configured to couple at least a part of the light propagating therein out of the waveguide substrate by diffraction, wherein the waveguide substrate is further formed with a coupling-in end light-return grating, and the coupling-in end light-return grating is configured to diffract the second beam of light, so as to make it propagate towards the coupling-out grating.

Advantageously, the coupling-in end light-return grating is configured to diffract the second beam of light to form a third beam of light, and the third beam of light propagates in the waveguide substrate at the same total reflection angle as that of the first beam of light.

Advantageously, the coupling-in grating has a grating period $d_1$ along a direction, and the coupling-in end light-return grating has a grating period $d_2$ along the same direction, and $d_1 = 2d_2$.

Advantageously, the coupling-in grating and the coupling-in end light-return grating are respectively formed on two opposite surfaces of the waveguide substrate, and in a projection perpendicular to the two surfaces, the coupling-in end light-return grating partially overlaps the coupling-in grating.

Advantageously, the coupling-in grating has a first grating vector, the coupling-in end light-return grating is a one-dimensional grating, and the coupling-in end light-return grating has a grating vector which is parallel to the first grating vector.

Advantageously, the coupling-in end light-return grating has a trapezoidal shape, two parallel sides of the trapezoidal shape are perpendicular to the first grating vector, and the width of the coupling-in end light-return grating increases along a propagation direction of the second beam of light.

In some embodiments, the coupling-in grating is a two-dimensional grating.

In some embodiments, the coupling-in grating is a one-dimensional grating and has a first grating vector, the coupling-in end light-return grating is a one-dimensional grating, and the coupling-in end light-return grating has a grating vector which is at a predetermined angle with respect to the first grating vector.

In some embodiments, the coupling-in grating has a first grating vector, the coupling-in end light-return grating comprises a first one-dimensional grating and a second one-dimensional grating, the first one-dimensional grating has a grating vector which forms a first angle with respect to the first grating vector, and the second one-dimensional grating has a grating vector which forms a second angle with respect to the first grating vector.

Advantageously, the first angle and the second angle are angles with opposite directions and are both 60°.

In some embodiments, the waveguide substrate is further formed with a deflection grating, and the deflection grating is configured to deflect the light from the coupling-in end light-return grating toward the coupling-out grating.

Advantageously, the width of the coupling-in end light-return grating in the direction perpendicular to the first grating vector is greater than or equal to the width of the coupling-in grating in the direction.

Advantageously, the waveguide substrate is further formed with a coupling-out end light-return grating, and the coupling-out end light-return grating is configured to receive light from the coupling-out grating and diffract the light back to the coupling-out grating; and the coupling-out grating and the coupling-out end light-return grating are respectively formed on two opposite surfaces of the waveguide substrate, and in a projection perpendicular to the two surfaces, the coupling-out end light-return grating partially overlaps the coupling-out grating.

Advantageously, the coupling-out grating has a first side for receiving light from the coupling-in grating, a second side opposite to the first side and a third side and a fourth side between the first side and the second side, and in the projection, the coupling-out end light-return grating lies across the second side.

Advantageously, in the projection, the coupling-out end light-return grating lies across the second side, the third side, and the fourth side.

Advantageously, the coupling-out end light-return grating is formed in a U shape.

Advantageously, the coupling-out end light-return grating comprises a grating region formed with a grating structure and several grating-free regions distributed in the grating region.

In some embodiments, the coupling-in grating is a one-dimensional grating, and the waveguide substrate is further formed with a turning grating, and the light from the coupling-in grating is expanded in one dimension and deflected by the turning grating so as to propagate toward the coupling-out grating; the waveguide substrate is also formed with an intermediate light-return grating which is configured to receive light from the turning grating and diffract it back to the turning grating; and the turning grating and the intermediate light-return grating are respectively formed on the two surfaces of the waveguide substrate, and in the projection, the intermediate light-return grating partially overlaps the turning grating.

Advantageously, the turning grating has a first edge opposite to the coupling-in grating and a second edge opposite to the coupling-out grating, and in the projection, the intermediate light-return grating lies across the first edge and the second edge.

According to one aspect of the invention, a display device is provided, comprising the diffractive optical waveguide.

Advantageously, the display device is a near-eye display device and comprises a lens and a frame for keeping the lens close to the eye, the lens comprising the diffractive optical waveguide.

Advantageously, the frame comprises a holder abutting against the lens to hold the lens, and the coupling-in end light-return grating of the diffractive optical waveguide is located in an area where the lens abuts the holder.

Advantageously, the display device further comprises an optical machine for projecting light with image information onto the coupling-in grating of the diffractive optical waveguide, the optical machine is mounted on the holder and faces the coupling-in grating.

Advantageously, the display device is an augmented reality display device or a virtual reality display device.

According to embodiments of the invention, by providing the coupling-in end light-return grating and/or improving the arrangement of the coupling-in end light-return grating, the optical coupling efficiency of the diffractive optical waveguide is improved, and the optical energy distribution uniformity of the optical output field of the diffractive optical waveguide is advantageously improved.

BRIEF DESCRIPTION OF THE DRAWINGS

Other features, objects, and advantages of the invention will become more apparent by reading the following detailed description of non-limitative embodiments with reference to the following drawings.

DETAILED DESCRIPTION

The invention will be further described in detail in conjunction with drawings and embodiments. It should be understood that the specific embodiments described herein are only used to explain the related invention, but not to limit the invention. In addition, it should be noted that, for the convenience of description, only the parts related to the invention are shown in the drawings.

It should be noted that the embodiments in the present application and the features of the embodiments can be combined with each other without conflict. The invention will be described in detail below with reference to drawings and embodiments.

Figure 1:
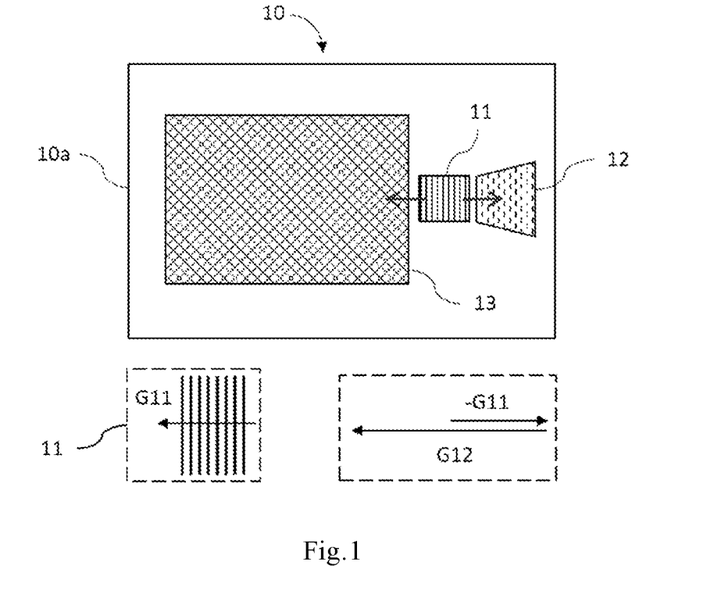
FIG. 1 is a schematic diagram of Example 1 of a diffractive optical waveguide according to Embodiment 1 of the invention.
Figure 2:
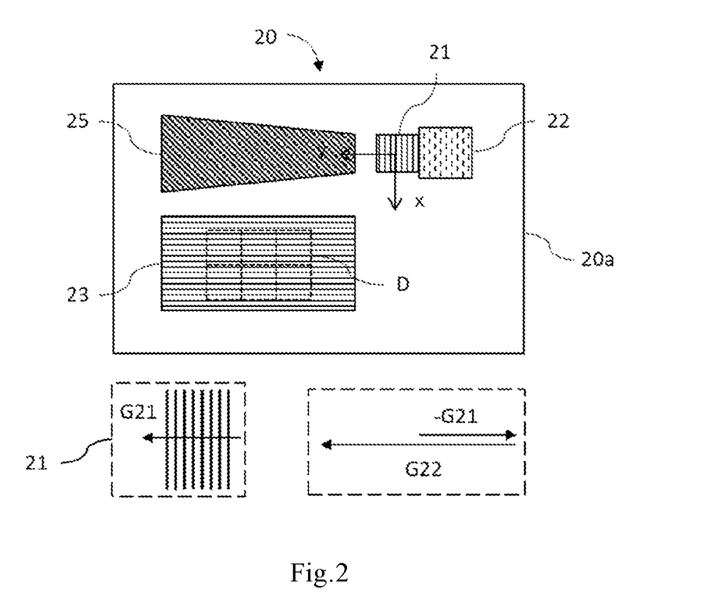
FIG. 2 is a schematic diagram of Example 2 of a diffractive optical waveguide according to Embodiment 1 of the invention.

Firstly, a diffractive optical waveguide according to Embodiment 1 of the invention will be introduced with reference to FIG. 1 and FIG. 2.

FIG. 1 shows Example 1 of the diffractive optical waveguide according to Embodiment 1, that is, diffractive optical waveguide 10. As shown in FIG. 1, the diffractive optical waveguide 10 comprises a waveguide substrate 10a, and the waveguide substrate 10a is formed with a coupling-in grating 11, a coupling-in end light-return grating 12, and a coupling-out grating 13.

The coupling-in grating 11 is a one-dimensional grating, which is configured to couple an input beam irradiated on the coupling-in grating 11 into the waveguide substrate 10a so that it propagates in the waveguide substrate 10a through total reflection and forms a first beam of light propagating toward the coupling-out grating 13 (for example, as shown by a leftward arrow in FIG. 1) and a second beam of light not propagating toward the coupling-out grating 13 (for example, as shown by a rightward arrow in FIG. 1). The coupling-in end light-return grating 12 is configured to diffract the second beam of light, so as to make it propagate towards the coupling-out grating 13. The coupling-out grating 13 is a two-dimensional grating configured to couple at least a part of the light propagating therein out of the waveguide substrate 10a by diffraction.

Specifically, in the example shown in FIG. 1, the coupling-in grating 11 has a plurality of linear grooves periodically arranged along the direction indicated by the arrow in FIG. 1 (see the figure in the lower left corner of FIG. 1). That is, the extension direction of the linear grooves of the coupling-in grating 11 is perpendicular to the direction shown by the arrow. The input beam (such as light carrying image information) irradiated on the coupling-in grating 11 from the outside of the waveguide substrate 10a is diffracted by the coupling-in grating 11 to form positive first-order diffracted light and negative first-order diffracted light. The positive first-order diffracted light propagates in the waveguide substrate 10a through total reflection (total internal reflection) along the leftward arrow in FIG. 1 to form the first beam of light; The negative first-order diffracted light propagates in the waveguide substrate 10a through total reflection along the rightward arrow in FIG. 1 to form the second beam of light.

In this case, the coupling-in grating 11 has a grating vector G11 as shown in the figure in the lower left corner of FIG. 1. In this application, "grating vector" is used to describe the periodic characteristics of the grating structure, wherein the direction of the "grating vector" is parallel to the direction along which the structure of the grating is periodically changed/arranged (for example, perpendicular to the grating lines/grooves direction) and is consistent with the propagation direction of the positive first-order diffracted light of the grating; the magnitude of the "grating vector" is $2\pi/d$, where d is the period of the grating structure in the direction of the "grating vector", also known as "grating period".

In the example shown in FIG. 1, the coupling-in end light-return grating 12 is arranged on the opposite side of the coupling-in grating 11 to the coupling-out grating 13. The coupling-in end light-return grating 12 is configured to diffract the second beam of light to form a third beam of light. According to this embodiment, the third beam of light propagates along the same direction as the first beam of light (for example, along the leftward arrow in FIG. 1), so as to enter the coupling-out grating 13. In order to enable the light incident on the waveguide substrate 10a at the same incident angle to be coupled out from the waveguide substrate at the same angle of emergence through the coupling-out grating 13, according to this embodiment, the coupling-in end light-return grating 12 is configured so that the third beam of light propagates in the waveguide substrate at the same total reflection angle as the first beam of light.

To this end, according to this embodiment, the coupling-in end light-return grating 12 can have a grating vector G12 as shown in the figure in the lower right corner of FIG. 1, the grating vector G12 has a direction that is the same as the direction of G11, and a magnitude that is twice of that of the grating vector G11. In other words, the grating period $d_1$ of the coupled-in grating 11 in the direction of the grating vector G11 and the grating period $d_2$ of the coupling-in end light-return grating 12 in the direction of the grating vector G12 satisfy $d_1 = 2d_2$. Light diffracted by grating has complicated angle changes, which is difficult to introduce here concisely and clearly. However, an intuitive explanation can be provided from a grating vector perspective. For example, referring to the figure in the lower right corner of FIG. 1, the negative first-order diffracted light (the second beam of light) of the coupling-in grating 11 is equivalent to that obtained by applying the influence of a grating vector –G11 opposite to the direction of the grating vector G11 on the input beam; the second beam of light diffracted by the coupling-in end light-return grating 12 is equivalent to superimposing the influence of the coupling-in end light-return grating 12 on the influence of the grating vector –G11, such that the third beam of light is obtained. As shown in the figure in the lower right corner of FIG. 1, the overall effect of the grating vectors –G11 and G12 on the third beam of light is equivalent to the influence of the grating vector G11 on the input beam, which is the same as the first beam of light. This is consistent with the result of calculating the light angle based on the refraction, diffraction, and reflection of the input beam incident on the diffractive optical waveguide 10.

As shown in FIG. 1, preferably, the coupling-in end light-return grating 12 has a trapezoidal shape, and two sides parallel to each other of the trapezoidal shape are perpendicular to the first grating vector G11 of the coupling-in grating 11; the width of the coupling-in end light-return grating 12 increases along the propagation direction of the second beam of light. This structure is provided in consideration of that when the diffractive optical waveguide is used to display images, the received input beam is not completely perpendicular to the surface of the waveguide substrate 10a, but has a certain field of view (FOV), which results in that each of the first beam of light and the second beam of light obtained through the diffraction of the coupling-in grating 11 propagates through total reflection in the waveguide substrate 10a with a certain expanding angle with respect to the direction shown by the arrow in FIG. 1. According to the embodiment of the invention, in order to sufficiently "return" the second beam of light to the coupling-out grating 13 to improve the utilization efficiency of the light, the coupling-in end light-return grating 12 preferably has the trapezoidal shape. However, it should be understood that the coupling-in end light-return grating 12 can also have any other suitable shape whose width in the direction perpendicular to the grating vector G11 of the coupling-in grating is greater than or equal to the width of the coupling-in grating 11. This is applicable to any coupling-in end light-return grating in diffractive optical waveguides of each embodiment described below, and will not be repeated in the following.

FIG. 2 shows Example 2 of the diffractive optical waveguide according to Embodiment 1, that is, diffractive optical waveguide 20. As shown in FIG. 2, the diffractive optical waveguide 20 comprises a waveguide substrate 20a, and the waveguide substrate 20a is formed with a coupling-in grating 21, a coupling-in end light-return grating 22, a coupling-out grating 23 and a turning grating 25.

The coupling-in grating 21 is a one-dimensional grating, which has a grating vector G21 as shown in the lower left corner of FIG. 2. The coupling-in end light-return grating 22 has a grating vector G22, and the direction of the grating vector G22 is the same as that of the grating vector G21, and its magnitude is twice of that of the latter. The coupling-in grating 21 and the coupling-in end light-return grating 22 can have the same structure and function as the coupling-in grating 11 and the coupling-in end light-return grating 12 in the diffractive optical waveguide 10 introduced above with reference to FIG. 1, and will not be repeated here.

As an example only, as shown in FIG. 2, the coupling-in end light-return grating 22 can have a rectangular shape with a width greater than the coupling-in grating 21 in the direction perpendicular to the grating vector G21.

In the example shown in FIG. 2, the coupling-out grating 23 and the turning grating 25 are one-dimensional gratings, and the light from the coupling-in grating 21 propagates towards the coupling-out grating 23 after deflection and one-dimensional expansion of the turning grating 25 in one direction (such as the left and right directions in FIG. 2). The coupling-out grating 23 expands the received light in another direction (such as the up and down directions in FIG. 2) and gradually couples the light out of the waveguide substrate 20a during the expansion process. In applications for image display, this can provide image display after two-dimensional pupil expansion.

In order to study the effect of the coupling-in end light-return grating on the optical coupling efficiency of the diffractive optical waveguide, based on the diffractive optical waveguide 20 shown in FIG. 2, a simulation example is designed, in which:

(1) the refractive index of the waveguide substrate is 1.816;

(2) the grating period of the coupling-in grating is 420 nm;

(3) the coupling-in end light-return grating is a rectangular grating with a grating period of 210 nm, a duty cycle of 26%, and a depth of 210 nm;

(4) the wavelength of the input beam is 532 nm, and the angle of the input beam (FOV) changes within the range of −15°~15° in the plane perpendicular to the x-axis shown in FIG. 2 and remains in the plane perpendicular to the y-axis as 0°; and (5) the detection surface D of the photodetector is configured to receive at least part of the light coupled out from the coupling-in grating 23.

Based on the above conditions, the optical energy detected by the photodetector with or without the coupling-in end light-return grating 22 is calculated respectively with a certain input beam angle, and the following results are obtained:

| FOV | (15°, 0°) | (8°, 0°) | (0°, 0°) | (−8°, 0°) | (−15°, 0°) |
|---|---|---|---|---|---|
| Without light-return grating 22 | 3.26E−04 | 4.30E−04 | 8.75E−04 | 6.00E−04 | 2.22E−03 |
| With light-return grating 22 | 6.95E−04 | 8.91E−03 | 1.04E−03 | 7.00E−04 | 2.23E−03 |
| Efficiency improvement | 113% | 107% | 19% | 17% | 0% |

In the above calculation, the optical energy of the input beam is fixed.

It should be understood that the influence of the turning grating 25 and the coupling-out grating 23 on the coupling efficiency of light is fixed, the structure and efficiency of the turning grating 25 and the coupling-out grating 23, as well as size and position of the detection surface D of the photodetector, do not have a significant impact on the improvement of the optical coupling efficiency brought by the coupling-in end light-return grating in the above example.

From the results of the above calculation example, it can be seen that the coupling-in end light-return grating helps to improve the optical coupling efficiency of the diffractive optical waveguide, and corresponding to a certain range of field of view, it can greatly improve the optical coupling efficiency. This advantageously improves the brightness of image displays based on diffractive optical waveguide.

In the diffractive optical waveguide according to Embodiment 1 of the invention shown in FIG. 1 and FIG. 2, both the coupling-in gratings 11 and 21 are one-dimensional gratings. It should be understood that the invention is not limited to this, and in other embodiments, a two-dimensional grating can also be used as the coupling-in grating. In this case, the coupling-in grating has more than one grating vector, and the grating vector of the coupling-in end light-return grating can be in the same/parallel direction as one of the grating vectors of the coupling-in grating, as long as the diffraction through the coupling-in end light-return grating can make the second beam of light from the coupling-in grating propagate toward the coupling-out grating.

Figure 3:
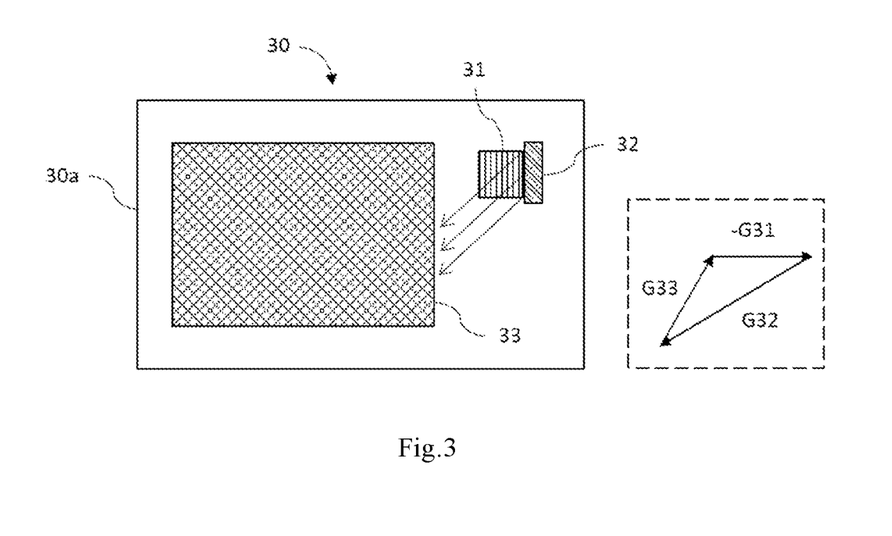
FIG. 3 is a schematic diagram of Example 1 of a diffractive optical waveguide according to Embodiment 2 of the invention.
Figure 4:
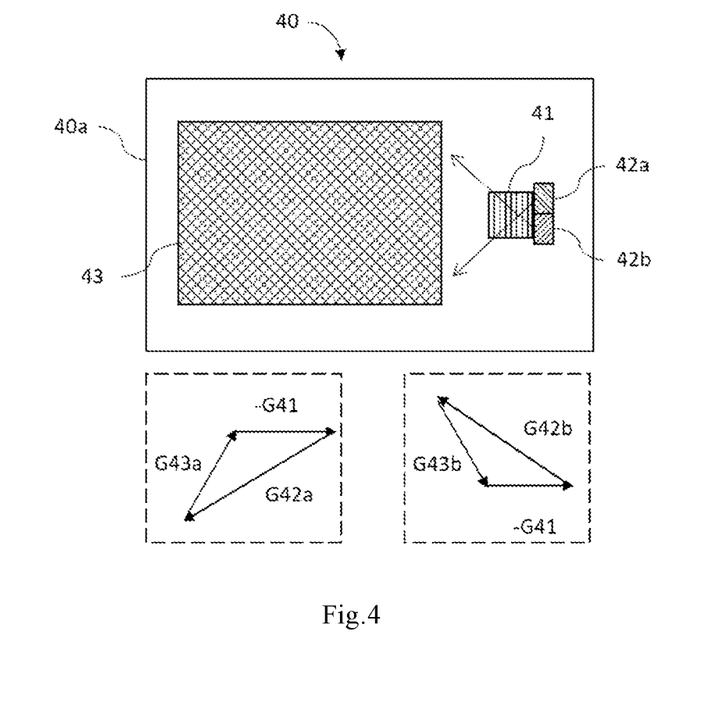
FIG. 4 is a schematic diagram of Example 2 of a diffractive optical waveguide according to Embodiment 2 of the invention.
Figure 5:
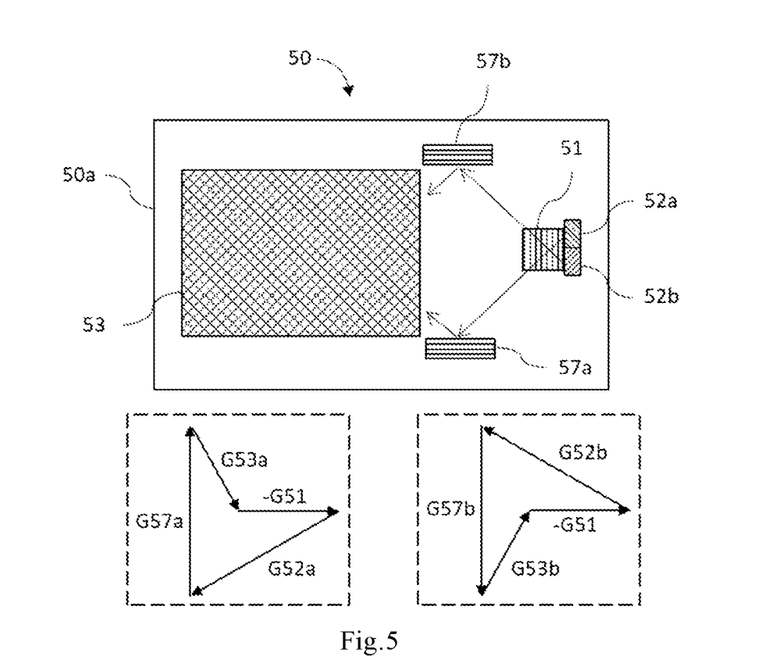
FIG. 5 is a schematic diagram of Example 3 of a diffractive optical waveguide according to Embodiment 2 of the invention.

FIGS. 3 to 5 show different examples of diffractive optical waveguide according to Embodiment 2 of the invention, wherein a direction of a grating vector of coupling-in end light-return grating is at a predetermined angle with respect to a direction of a grating vector of a coupling-in grating.

In the example shown in FIG. 3, a diffractive optical waveguide 30 comprises a waveguide substrate 30a and a coupling-in grating 31, a coupling-in end light-return grating 32, and a coupling-out grating 33 formed on the waveguide substrate 30a. The coupling-in grating 31 is a one-dimensional grating and has a grating vector G31 (the figure on the right of FIG. 3 shows a grating vector −G31 which is opposite to the grating vector G31 and has the same magnitude). The coupling-in end light-return grating 32 is a one-dimensional grating and has a grating vector G32. As shown in FIG. 3, the direction of the grating vector G32 is at an angle to the direction of the grating vector G31.

The coupling-out grating 33 is a two-dimensional grating, and one of the grating vectors of the two-dimensional grating is G33. According to this embodiment, the coupling-in end light-return grating 32 is configured so that the vector sum of the grating vector G32, the grating vector −G31 and the grating vector G33 is zero. In this way, the input beam is diffracted by the coupling-in grating 31 to form positive first-order diffracted light (a first beam of light) propagating toward the coupling-out grating 33 and negative first-order diffracted light (a second beam of light) not propagating toward the coupling-out grating 33; The second beam of light passes through the diffraction of the coupling-in end light-return grating 32, propagates toward the coupling-out grating 33, and finally couples out from the waveguide substrate 30a through the diffraction of the coupling-out grating 33, and the light coupled out from the waveguide substrate 30a remains the same angle as the input beam, so that the image information carried by the input beam can be restored.

As shown in FIG. 3, in the case where the coupling-in grating 31 is not centered with respect to the coupling-out grating 33, the coupling-in end light-return grating 32 can be arranged so that the light follows, for example, the direction shown by the parallel arrow in the figure on the right of FIG. 3 to propagate toward the coupling-out grating 33 to supplement the insufficient brightness of the lower half of the coupling-out grating 33 caused by the upward bias of the coupling-in grating 31.

In the example shown in FIG. 4, the diffractive optical waveguide 40 comprises a waveguide substrate 40a and a coupling-in grating 41, a coupling-in end light-return grating 42, and a coupling-out grating 43 formed on the waveguide substrate 40a. The coupling-in grating 41 is a one-dimensional grating and has a grating vector G41 (the figure on the right of FIG. 4 shows a grating vector −G41 which is opposite to the grating vector G41 and has the same magnitude). The coupling-in end light-return grating 42 comprises a first one-dimensional grating 42a and a second one-dimensional grating 42b, a grating vector G42a of the first one-dimensional grating 42a forms a first angle with respect to the grating vector G41 and a grating vector G42b of the second one-dimensional grating 42b forms a second angle with respect to the grating vector G41. In the example shown in FIG. 4, the light diffracted by the first one-dimensional grating 42a and the second one-dimensional grating 42b converges toward the coupling-out grating 43; In other examples, the diffracted light can also diverge toward the coupling-out grating 43. Preferably, the first angle and the second angle are in opposite directions, and both are 60°.

The coupling-out grating 43 is a two-dimensional grating, and the two grating vectors of the two-dimensional grating are G43a and G43b. According to this embodiment, the coupling-in end light-return grating 42 is configured so that the vector sum of the grating vector G42a, the grating vector −G41, and the grating vector G43a is zero (as shown in the figure in the lower left corner of FIG. 4), and the vector sum of the grating vector G42b, the grating vector −G41 and the grating vector G43b is zero (as shown in the figure in the lower right corner of FIG. 4). In this way, negative first-order diffracted light (a second beam of light) formed by the input beam through the diffraction of the coupling-in grating 41 is coupled out from the waveguide substrate 40a through the diffraction of the coupling-in end light-return grating 42 and the coupling-out grating 43, and the light coupled out from the waveguide substrate 40a maintains the same angle as the input beam, so that the image information carried by the input beam can be restored.

As shown in FIG. 4, the design of the diffractive optical waveguide 40 helps to supplement the insufficient light intensity at the two corners of the coupling-out grating 43 near the coupling-in grating 41, thereby improving the uniformity of the optical output field of the diffractive optical waveguide.

In the example shown in FIG. 5, the diffractive optical waveguide 50 comprises a waveguide substrate 50a and a coupling-in grating 51, a coupling-in end light-return grating 52, and a coupling-out grating 53 formed on the waveguide substrate 50a. The coupling-in grating 51 is a one-dimensional grating and has a grating vector G51 (the figure on the right of FIG. 5 shows a grating vector −G51 which is opposite to the grating vector G51 and has the same magnitude). The coupling-in end light-return grating 52 comprises a first one-dimensional grating 52a and a second one-dimensional grating 52b, a grating vector G52a of the first one-dimensional grating 52a forms a first angle with respect to the grating vector G51 and a grating vector G52b of the second one-dimensional grating 52b forms a second angle with respect to the grating vector G51. In the example shown in FIG. 5, a deflection grating 57 is formed on the waveguide substrate 50a, comprising a grating 57a and a grating 57b, which is configured to deflect light from the coupling-in end light-return grating toward the coupling-out grating 53. Preferably, the first angle and the second angle are in opposite directions, and both are 60°.

The coupling-out grating 53 is a two-dimensional grating, and two grating vectors of the two-dimensional grating are G53a and G53b. The deflection gratings 57a and 57b have grating vectors G57a and G57b respectively. According to this embodiment, the coupling-in end light-return grating and the deflection grating are configured so that the vector sum of the grating vector G52a, the grating vector −G51, the grating vector 57a, and the grating vector G53a is zero (as shown in the figure in the lower left corner of FIG. 5), the vector sum of the grating vector G52b, the grating vector −G51, the grating vector 57b and the grating vector G53b is zero (as shown in the figure in the lower right corner of FIG. 5). In this way, negative first-order diffracted light (a second beam of light) formed by the input beam through the diffraction of the coupling-in grating 51 is coupled out from the waveguide substrate 50a through the diffraction of the coupling-in end light-return grating 52, the deflection grating 57, and the coupling-out grating 53, and the light coupled out from the waveguide substrate 50a maintains the same angle as the input beam so that the image information carried by the input beam can be restored.

As shown in FIG. 5, the design of the diffraction waveguide 50 helps to supplement the insufficient light intensity at the two corners of the coupling-out grating 53 near the coupling-in grating 51, thereby improving the uniformity of the optical output field of the diffractive optical waveguide. Compared with the diffractive optical waveguide 40 shown in FIG. 4, the arrangement of the deflection gratings 57a and 57b helps to make the light from the coupling-in end light-return grating 52 propagate a longer distance in the coupling-out grating 53, thereby being coupled out more fully by the out-coupling grating 53 to the outside of the waveguide substrate 60a, thereby improving the optical coupling efficiency. Similarly, in the diffractive optical waveguide 30 shown in FIG. 3, a deflection grating can also be provided near the lower right corner of the coupling-out grating 33.

Figure 6:
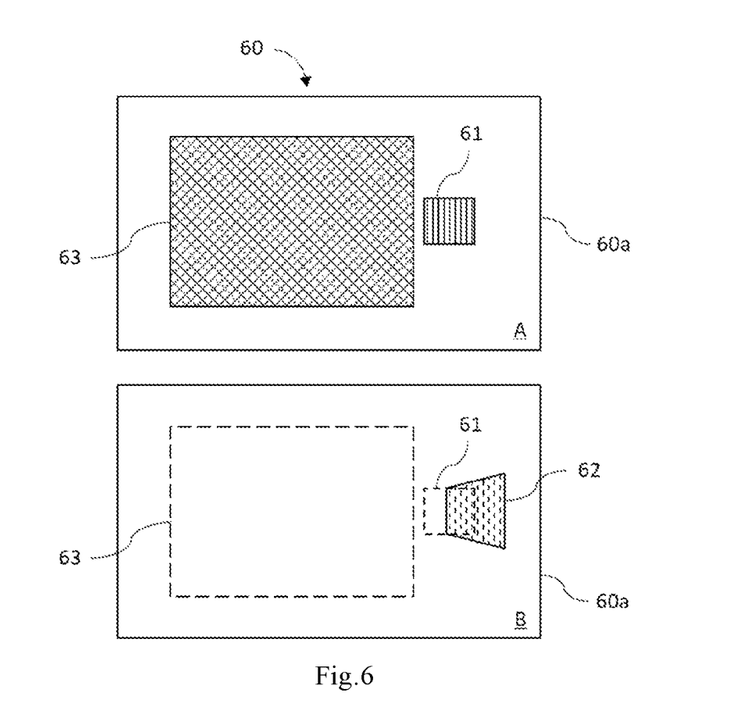
FIG. 6 is a schematic diagram of Example 1 of a diffractive optical waveguide according to Embodiment 3 of the invention.
Figure 7:
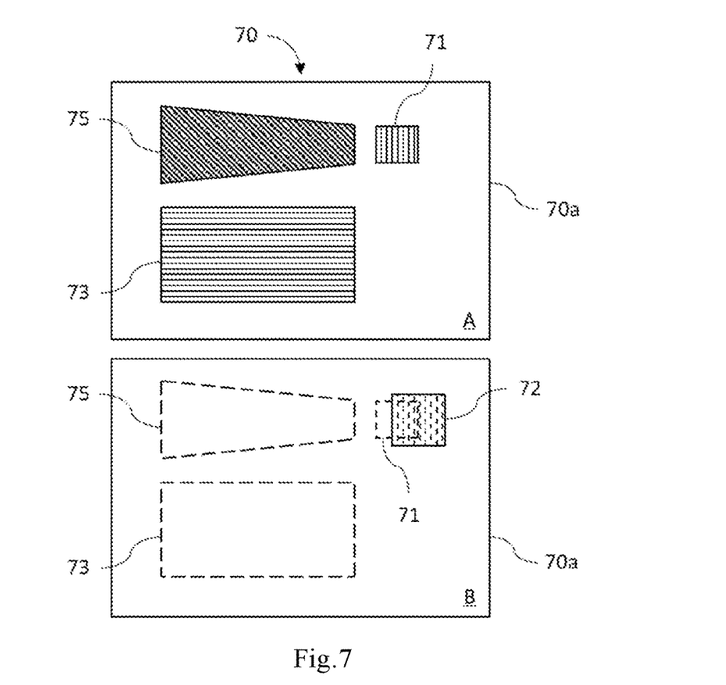
FIG. 7 is a schematic diagram of Example 2 of a diffractive optical waveguide according to Embodiment 3 of the invention.

FIGS. 6 and 7 show different examples of diffractive optical waveguide according to Embodiment 3 of the invention, wherein a coupling-in grating and a coupling-in end light-return grating are respectively formed on two opposite surfaces of the waveguide substrate.

A diffractive optical waveguide 60 according to Embodiment 3 of the invention shown in FIG. 6 comprises a waveguide substrate 60a and a coupling-in grating 61, a coupling-in end light-return grating 62, and a coupling-out grating 63 formed on the waveguide substrate 60a. The coupling-in grating 61, the coupling-in end light-return grating 62, and the coupling-out grating 63 of the diffractive optical waveguide 60 have the same configuration as the coupling-in grating 11, the coupling-in end light-return grating 12 and the coupling-out grating 13 of the diffractive optical waveguide 10 shown in FIG. 1, and will not be repeated here. According to this embodiment, in the diffractive optical waveguide 60, the coupling-in grating 61 and the coupling-in end light-return grating 62 are respectively formed on two opposite surfaces A and B of the waveguide substrate 60a. As an example only, as shown in FIG. 6, the coupling-in grating 61 and the coupling-out grating 63 are formed on the surface A of the waveguide substrate 60a, and the coupling-in end light-return grating 62 is formed on the surface B of the waveguide substrate 60a. In other examples, the coupling-out grating 63 and the coupling-in end light-return grating 62 can also be formed on the same surface.

As shown in FIG. 7, a diffractive optical waveguide 70 according to Embodiment 3 of the invention comprises a waveguide substrate 70a and a coupling-in grating 71, a coupling-in end light-return grating 72, a coupling-out grating 73 and a turning grating 75 formed on the waveguide substrate 70a. The coupling-in grating 71, the coupling-in end light-return grating 72, the coupling-out grating 73, and the turning grating 75 of the diffractive optical waveguide 70 have the same configuration as the coupling-in grating 21, the coupling-in end light-return grating 22, the coupling-out grating 23 and the turning grating 25 of the diffractive optical waveguide 20 shown in FIG. 2, and will not be repeated here. According to the present embodiment, in the diffractive optical waveguide 70, the coupling-in grating 71 and the coupling-in end light-return grating 72 are respectively formed on two opposite surfaces A and B of the waveguide substrate 70a. As an example only, as shown in FIG. 7, the coupling-in grating 71, the coupling-out grating 73, and the turning grating 75 are formed on the surface A of the waveguide substrate 70a, and the coupling-in end light-return grating 72 is formed on the surface B of the waveguide substrate 70a. In other examples, the coupling-out grating 73 and the turning grating 75 can also be formed on the same surface as the coupling-in end light-return grating 72, or be formed on different surfaces, respectively.

For the sake of clarity, in FIG. 6 and FIG. 7, the structure on the surface A is shown with dotted lines in the figure of the surface B of the waveguide substrate of the diffractive optical waveguide, and the structure on the surface B is not shown in the figure of the surface A.

As shown in FIG. 6 and FIG. 7, especially as shown in the figure of the surface B of the waveguide substrate, in the projection perpendicular to the surfaces A and B, the coupling-in end light-return grating 62 partially overlaps the coupling-in grating 61, the coupling-in end light-return grating 72 partially overlaps the coupling-in grating 71.

Since the second beam of light from the coupling-in grating is gradually diffracted back in the coupling-in end light-return grating, the longer the length of the coupling-in end light-return grating in the propagation direction of the second beam of light is, the more conducive it is to fully diffract the second beam of light back to the coupling-out grating. However, diffractive optical waveguides usually have size limitations in specific applications, and for a diffractive optical waveguide of a certain size, people usually hope to provide the largest possible exit pupil (corresponding to the largest possible coupling-out grating), so the area of diffractive optical waveguides that can be used for optical coupling-in is limited, which leads to the area that can be used for coupling-in grating and coupling-in end light-return grating is very limited. According to Embodiment 3 of the invention, since the coupling-in end light-return grating is arranged on the surface of the waveguide opposite to the surface where the coupling-in grating is located, it is allowed to increase the length of the coupling-in end light-return grating along the propagation direction of the second beam of light without increasing the overall area occupied by the coupling-in grating and the coupling-in end light-return grating, or reduce the overall area of the coupling-in grating and the coupling-in end light-return grating without reducing the length of the coupling-in end light-return grating. This is very advantageous for AR head-mounted display devices, for example.

It should be understood that the inventive concept that the coupling-in grating and the coupling-in end light-return grating are respectively arranged on two surfaces of the waveguide substrate in Embodiment 3 and overlap in the projection perpendicular to the surface can also be applied to, for example, referring to Embodiment 2 introduced in FIGS. 4 to 6 and other embodiments comprising the coupling-in grating and the coupling-in end light-return grating.

Figure 8:
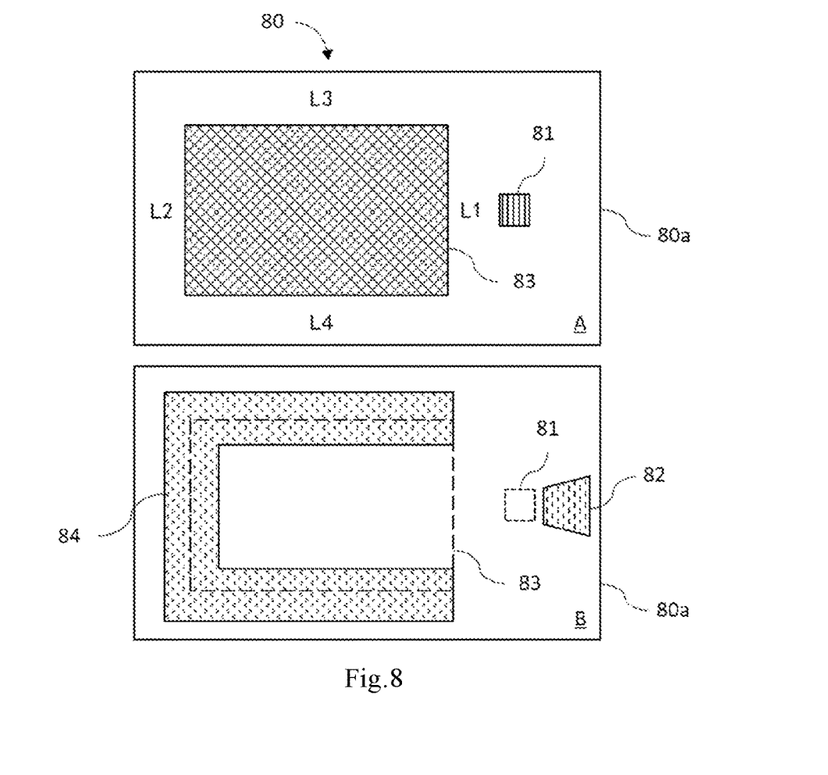
FIG. 8 is a schematic diagram of Example 1 of a diffractive optical waveguide according to Embodiment 4 of the invention.
Figure 9:
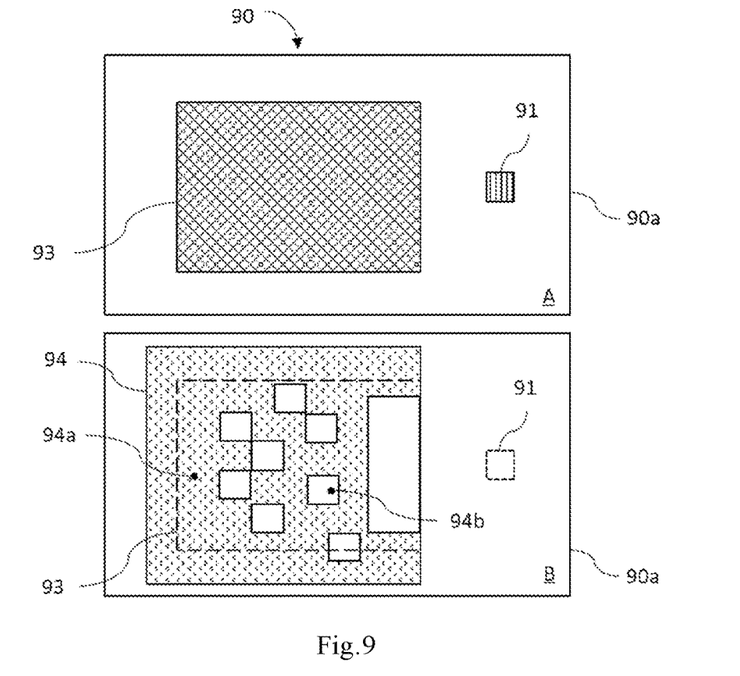
FIG. 9 is a schematic diagram of Example 2 of a diffractive optical waveguide according to Embodiment 4 of the invention.

FIG. 8 and FIG. 9 show different examples of a diffractive optical waveguide according to Embodiment 4 of the invention, wherein the diffractive optical waveguide further comprises a coupling-out end light-return grating, and the coupling-out end light-return grating and a coupling-out grating are formed on two opposite surfaces of the waveguide substrate.

The diffractive optical waveguide 80 according to Embodiment 4 of the invention shown in FIG. 8 comprises a waveguide substrate 80a and a coupling-in grating 81, a coupling-in end light-return grating 82, a coupling-out grating 83, and a coupling-out end light-return grating 84 formed on the waveguide substrate 80a. The coupling-out end light-return grating 84 is configured to receive light from the coupling-out grating 83 and diffract the light back to the coupling-out grating 83. The coupling-out end light-return grating 84 can be a one-dimensional grating or a two-dimensional grating, or can comprise different gratings in different regions. The invention is not limited in this respect.

The coupling-in grating 81, the coupling-in end light-return grating 82, and the coupling-out grating 83 of the diffractive optical waveguide 80 can have the same configuration as the coupling-in grating 11, the coupling-in end light-return grating 12, and the coupling-out grating 13 of the diffractive optical waveguide 10 shown in FIG. 1, and will not be repeated here.

According to Embodiment 4, the coupling-out grating 83 and the coupling-out end light-return grating 84 are respectively formed on two opposite surfaces A and B of the waveguide substrate 80a. As an example only, as shown in FIG. 8, the coupling-in grating 81 and the coupling-out grating 83 are formed on the surface A of the waveguide substrate 80a, and the coupling-out end light-return grating 84 is formed on the surface B of the waveguide substrate 80a. In other examples, the coupling-out end light-return grating 84 can also be located on the same surface as the coupling-in grating 81, for example, on the surface A. Similarly, the coupling-in grating 81 and the coupling-in end light-return grating 82 can be respectively formed on two opposite surfaces of the waveguide substrate, but the diffractive optical waveguide according to Embodiment 4 is not limited to such an arrangement.

According to Embodiment 4, as shown in FIG. 8, in the projection perpendicular to the two surfaces A and B of the waveguide substrate 80a, the coupling-out end light-return grating 84 partially overlaps the coupling-out grating 83 but does not cover the entire coupling-out grating 83. For the sake of clarity, in FIG. 8, the structure on the surface A is shown with dotted lines only in the figure of the surface B of the waveguide substrate of the diffractive optical waveguide 80.

The coupling-out grating 83 has a first side L1 for receiving light from the coupling-in grating 81, a second side L2 opposite to the first side L1, and a third side L3 and a fourth side L4 between the first side L1 and the second side L2. In the example shown in FIG. 8, the coupling-out end light-return grating is formed in a U shape and lies across the second side L2, the third side L3, and the fourth side L4 in the projection perpendicular to the surfaces A and B.

Although not shown, it should be understood that in some examples according to this embodiment, the coupling-out end light-return grating 84 can comprise three separate grating parts that are respectively lying across the second side L2, the third side L3 and the fourth side L4 of the coupling-out grating 83 in the projection; In some other examples, the coupling-out end light-return grating 84 can lie across the second side L2, the third side L3 and the fourth side L4 in the projection; In further examples, the coupling-out end light-return grating 84 can only lie across the second side L2 of the coupling-out grating 83 in the projection.

The diffractive optical waveguide 80 shown in FIG. 8 is particularly beneficial to overcome the problem that the central area (as shown by the dotted line box in FIG. 13) is dark and the surrounding area is bright in the prior art diffractive optical waveguide shown in FIG. 13. This is because the overlapping part of the coupling-out end light-return grating 84 and the coupling-out grating 83 in the projection perpendicular to the surfaces A and B is closer to the central area of the coupling-out grating 83. Through the diffraction of this part of the coupling-out end light-return grating 84, the light is gradually diffracted back when it is transmitted and coupled out in the area of the coupling-out grating, so that the light can return to the central area of the coupling-out grating 83, thus increasing the brightness of the central area of the optical output field and improving the uniformity of the light field.

Different positions of the coupling-out end light-return grating 84 can have different light-return efficiencies. Preferably, the further out, the higher the light-return efficiency, so as to improve the uniformity of the overall optical output field. The coupling-out end light-return grating 84 have different light-return efficiencies at different positions, which can be achieved by changing the grating structure within a period, including shape and depth, at different positions.

FIG. 9 shows another example according to Embodiment 4 of the invention. As shown in FIG. 9, a diffractive optical waveguide 90 comprises a waveguide substrate 90a and a coupling-in grating 91, a coupling-out grating 93, and a coupling-out end light-return grating 94 formed on the waveguide substrate 90a. The diffractive optical waveguide 90 can further comprise a coupling-in end light-return grating 92 formed on the waveguide substrate 90a, but it is not limited to this. The coupling-out end light-return grating 94 is configured to receive light from the coupling-out grating 93 and diffract the light back to the outcoupling grating 93. The coupling-out end light-return grating 94 can be a one-dimensional grating or a two-dimensional grating, or can comprise different gratings in different regions. The invention is not limited in this respect.

According to Embodiment 4, the coupling-out grating 93 and the coupling-out end light-return grating 94 are respectively formed on two opposite surfaces A and B of the waveguide substrate 90a, as shown in FIG. 9. In addition, as shown in FIG. 9, in the projection perpendicular to the two surfaces A and B of the waveguide substrate 90a, the coupling-out end light-return grating 94 partially overlaps the coupling-out grating 93 and does not cover the entire coupling-out grating 93. In the example shown in FIG. 9, the coupling-out end light-return grating 94 comprises a grating region 94a formed with a grating structure and several grating-free regions 94b distributed in the grating region 94a. For the sake of clarity, in FIG. 9, the structure on the surface A is shown with dotted lines only in the figure of the surface B of the waveguide substrate of the diffractive optical waveguide 90.

In the diffractive optical waveguide 90 shown in FIG. 9, by setting "blank" regions (i.e., grating-free regions 94b), it is convenient and beneficial to adjust the light-return efficiency from different positions of the coupling-out end light-return grating 94, thereby improving the uniformity of the optical output field of the coupling-out grating 93. Preferably, different positions in the grating region 94a of the coupling-out end light-return grating 94 can also have different grating structures, comprising shape and depth of the grating, so as to adjust the light-return efficiency at different positions and help to further improve the uniformity of the overall optical output field.

Figure 10:
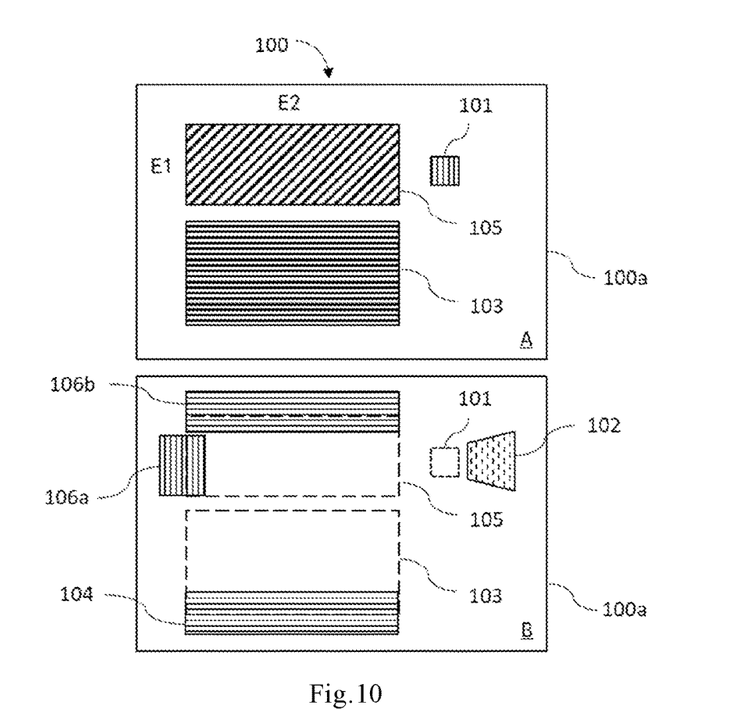
FIG. 10 is a schematic diagram of an example of a diffractive optical waveguide according to Embodiment 5 of the invention.

FIG. 10 is a schematic diagram of an example of a diffractive optical waveguide according to Embodiment 5 of the invention. As shown in FIG. 10, the diffractive optical waveguide 100 comprises a waveguide substrate 100a and a coupling-in grating 101, a coupling-in end light-return grating 102, a coupling-out grating 103, a coupling-out end light-return grating 104, a turning grating 105 and an intermediate light-return grating 106 formed on the waveguide substrate 100a. The intermediate light-return grating 106 is configured to receive light from the turning grating 105 and diffract it back to the turning grating 105.

The coupling-in grating 101, the coupling-in end light-return grating 102, the coupling-out grating 103, and the turning grating 105 can be configured in the same or similar way as the coupling-in grating 71, the coupling-in end light-return grating 72, the coupling-out grating 73 and the turning grating 75 in the diffractive optical waveguide 70 introduced with reference to FIG. 7, and will not be repeated here. As shown in FIG. 10, the coupling-in grating 101 and the coupling-in end light-return grating 102 can be respectively formed on two opposite surfaces of the waveguide substrate, and/or the coupling-out grating 103 and the coupling-out end light-return grating 104 can be respectively formed on two opposite surfaces of the waveguide substrate, but the diffractive optical waveguide according to Embodiment 5 is not limited to such an arrangement.

According to Embodiment 5, as shown in FIG. 10, the turning grating 105 and the intermediate light-return grating 106 are respectively formed on the two surfaces A and B of the waveguide substrate 100a, and in the projection perpendicular to the surfaces A and B, the intermediate light-return grating 106 partially overlaps the turning grating 105.

In the example shown in FIG. 10, the turning grating 105 has a first edge E1 opposite to the coupling-in grating 101 and a second edge E2 opposite to the coupling-out grating 103; the intermediate light-return grating 106 comprises a first grating 106a and a second grating 106b, in the projection perpendicular to the surfaces A and B, the first grating 106a and the second grating 106b lie across the first edge E1 and the second edge E2 of the turning grating 105, respectively.

The diffractive optical waveguides according to different embodiments of the invention have been described above with reference to the accompanying drawings. It should be understood that different embodiments and features in the embodiments can be combined with each other under the condition of no conflict.

Figure 11:
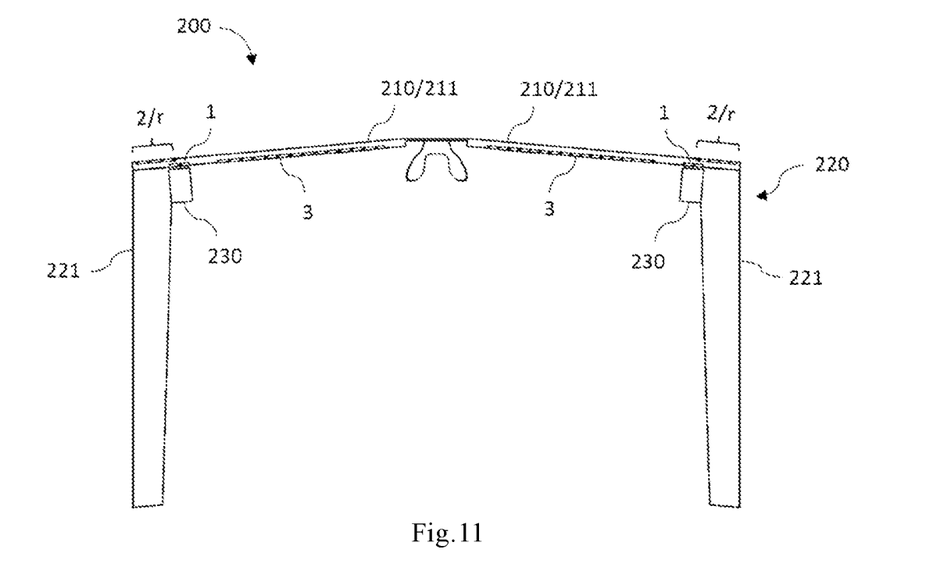
FIG. 11 is a schematic diagram of an example of a display device according to an embodiment of the invention.

Finally, a display device according to an embodiment of the invention will be described with reference to FIG. 11 and FIG. 12. FIG. 11 is a schematic diagram of a display device 200 according to an embodiment of the invention, and FIG. 12 is a schematic diagram of lens/diffractive optical waveguide in the display device 200.

As shown in FIG. 11, a display device 200 according to an embodiment of the invention can be a near-eye display device, comprising a lens 210 and a frame 220 for keeping the lens 210 close to the eye, wherein the lens 210 comprises the diffractive optical waveguide according to an embodiment of the invention. In FIG. 11 and FIG. 12, the diffractive optical waveguide according to the embodiment of the invention is marked with reference numeral "211".

Figure 12:
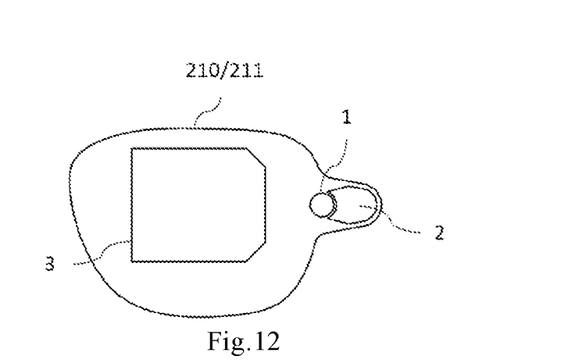
FIG. 12 is a schematic diagram of lens/diffractive optical waveguide used in the display device shown in FIG. 11.

In the example shown in FIG. 12, the lens 210 can consist of the diffractive optical waveguide 211 as a whole; in other cases, the lens 210 can comprise a carrier sheet, and the diffractive optical waveguide 211 is attached or otherwise fixed on the carrier sheet.

Referring to FIG. 11 and FIG. 12 in conjunction, the frame 220 can comprise a holder 221 abutting against the lens 210 to hold the lens 210 (for example, the leg form formed into a spectacle frame), and the coupling-in end light-return grating 2 of the diffractive optical waveguide 211 is located in a region r (see FIG. 11) where the lens 210 abuts against the holder 221.

The display device 200 can further comprise an optical machine 230 for projecting light with image information onto the coupling-in grating 1 of the diffractive optical waveguide 211, as shown in FIGS. 11 and 12, the optical mechanism 230 can be mounted on the holder 221 and face the coupling-in grating 1.

The display device 200 can be an augmented reality display device or a virtual reality display device.

The above description is merely an illustration of the preferred embodiments of the present application and the applied technical principles. Those skilled in the art should understand that the scope of the invention involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A diffractive optical waveguide, comprising a waveguide substrate, the waveguide substrate being formed with a coupling-in grating and a coupling-out grating, the coupling-in grating being configured to couple an input beam into the waveguide substrate so that the input beam propagates in the waveguide substrate through total reflection and forms a first beam of light propagating toward the coupling-out grating and a second beam of light not propagating toward the coupling-out grating, and the coupling-out grating being configured to couple at least a part of the light propagating therein out of the waveguide substrate by diffraction, wherein the waveguide substrate is further formed with a coupling-in end light-return grating, and the coupling-in end light-return grating is configured to diffract the second beam of light, so as to make it propagate towards the coupling-out grating, the coupling-in end light-return grating is configured to diffract the second beam of light to form a third beam of light, and the third beam of light propagates in the waveguide substrate at the same total reflection angle as that of the first beam of light, and the coupling-in grating has a grating period $d_i$ along a direction, and the coupling-in end light-return grating has a grating period $d_2$ along the same direction, and $d_i=2d_2$.

2. The diffractive optical waveguide of claim 1, wherein the coupling-in grating and the coupling-in end light-return grating are respectively formed on two opposite surfaces of the waveguide substrate, and in a projection perpendicular to the two surfaces, the coupling-in end light-return grating partially overlaps the coupling-in grating.

3. The diffractive optical waveguide of claim 1, wherein the coupling-in grating has a first grating vector, the coupling-in end light-return grating is a one-dimensional grating, and the coupling-in end light-return grating has a grating vector which is parallel to the first grating vector.

4. The diffractive optical waveguide of claim 3, wherein the coupling-in end light-return grating has a trapezoidal shape, two parallel sides of the trapezoidal shape are perpendicular to the first grating vector, and the width of the coupling-in end light-return grating increases along a propagation direction of the second beam of light.

5. The diffractive optical waveguide of claim 3, wherein, the width of the coupling-in end light-return grating in the direction perpendicular to the first grating vector is greater than or equal to the width of the coupling-in grating in the direction.

6. The diffractive optical waveguide of claim 1, wherein the waveguide substrate is further formed with a coupling-out end light-return grating, and the coupling-out end light-return grating is configured to receive light from the coupling-out grating and diffract the light back to the coupling-out grating; and the coupling-out grating and the coupling-out end light-return grating are respectively formed on two opposite surfaces of the waveguide substrate, and in a projection perpendicular to the two surfaces, the coupling-out end light-return grating partially overlaps the coupling-out grating.

7. The diffractive optical waveguide of claim 6, wherein the coupling-out grating has a first side for receiving light from the coupling-in grating, a second side opposite to the first side, and a third side and a fourth side between the first side and the second side, and in the projection, the coupling-out end light-return grating lies across the second side.

8. The diffractive optical waveguide of claim 7, wherein, in the projection, the coupling-out end light-return grating lies across the second side, the third side, and the fourth side.

9. The diffractive optical waveguide of claim 6, wherein the coupling-out end light-return grating comprises a grating region formed with a grating structure and several grating-free regions distributed in the grating region.

10. The diffractive optical waveguide of claim 1, wherein the coupling-in grating is a one-dimensional grating, the waveguide substrate is further formed with a turning grating, and the light from the coupling-in grating is expanded in one dimension and deflected by the turning grating so as to propagate toward the coupling-out grating;

the waveguide substrate is further formed with an intermediate light-return grating which is configured to receive light from the turning grating and diffract it back to the turning grating; and the turning grating and the intermediate light-return grating are respectively formed on the two surfaces of the waveguide substrate, and in the projection, the intermediate light-return grating partially overlaps the turning grating.

11. The diffractive optical waveguide of claim 10, wherein the turning grating has a first edge opposite to the coupling-in grating and a second edge opposite to the coupling-out grating, and in the projection, the intermediate light-return grating lies across the first edge and the second edge.

12. A display device, comprising a diffractive optical waveguide, the diffractive optical waveguide comprising a waveguide substrate, and the waveguide substrate being formed with a coupling-in grating and a coupling-out grating, the coupling-in grating being configured to couple an input beam into the waveguide substrate so that the input beam propagates in the waveguide substrate through total reflection and forms a first beam of light propagating toward the coupling-out grating and a second beam of light not propagating toward the coupling-out grating, and the coupling-out grating being configured to couple at least a part of the light propagating therein out of the waveguide substrate by diffraction,     wherein the waveguide substrate is further formed with a coupling-in end light-return grating, and the coupling-in end light-return grating is configured to diffract the second beam of light, so as to make it propagate towards the coupling-out grating,     the coupling-in end light-return grating is configured to diffract the second beam of light to form a third beam of light, and the third beam of light propagates in the waveguide substrate at the same total reflection angle as that of the first beam of light, and     the coupling-in grating has a grating period di along a direction, and the coupling-in end light-return grating has a grating period $d_2$ along the same direction, and $d_1=2d_2$.

13. The display device of claim 12, wherein the display device is a near-eye display device and comprises a lens and a frame for keeping the lens close to the eye, the lens comprising the diffractive optical waveguide; and     the frame comprises a holder abutting against the lens to hold the lens, and the coupling-in end light-return grating of the diffractive optical waveguide is located in an area where the lens abuts the holder.

* * * * *